US007696426B2

(12) United States Patent
Cope

(10) Patent No.: US 7,696,426 B2
(45) Date of Patent: Apr. 13, 2010

(54) RECOMBINANT MUSIC COMPOSITION ALGORITHM AND METHOD OF USING THE SAME

(75) Inventor: David H. Cope, Santa Cruz, CA (US)

(73) Assignee: Recombinant Inc., Elk Grove, CA (US)

( * ) Notice: Subject to any disclaimer, the term of this patent is extended or adjusted under 35 U.S.C. 154(b) by 339 days.

(21) Appl. No.: 11/613,097

(22) Filed: Dec. 19, 2006

(65) Prior Publication Data

US 2008/0141850 A1 Jun. 19, 2008

(51) Int. Cl.
*G10H 1/26* (2006.01)
*G06F 17/00* (2006.01)
*G10F 1/00* (2006.01)

(52) U.S. Cl. .............................. 84/609; 84/615; 700/94

(58) Field of Classification Search .................. 84/604, 84/609, 615; 700/94
See application file for complete search history.

(56) References Cited

U.S. PATENT DOCUMENTS

| | | | |
|---|---|---|---|
| 4,982,643 | A | 1/1991 | Minamitaka |
| 5,099,740 | A | 3/1992 | Minamitaka |
| 6,740,802 | B1 | 5/2004 | Browne, Jr. |
| 6,835,886 | B2 | 12/2004 | Tamura et al. |
| 6,867,359 | B2 | 3/2005 | Koseki et al. |
| 6,916,978 | B2 | 7/2005 | Georges |
| 2001/0025561 | A1 | 10/2001 | Milburn et al. |
| 2002/0033090 | A1 | 3/2002 | Iwamoto et al. |

OTHER PUBLICATIONS

D. Cope, "Recombinance" from *Computer Models of Musical Creativity*, Ch. 4 pp. 87-123; (MIT Press 2005).
D. Cope "Computer Analysis of Musical Allusions"; *Computer Music J.* vol. 27, No. 1 (MIT Press Spring 2003).
D. Cope, "The Importance of Patterns" (Ch. 5 pp. 109-125); "Structure" (Ch. 6 pp. 127-137); "Databases" (Ch. 7 pp. 141-146) and "Analysis" (Ch. 8 pp. 147-151) from *Virtual Music: Computer Synthesis of Musical Style* (MIT Press, 2001).
D. Cope, "Computer Modeling of Musical Intelligence in EMI"; *Computer Music J.* vol. 16, No. 2 (MIT1992).
D. Cope, "Musical Style Representations" (Ch. 2 pp. 27-70) and "Musical Examples" (Ch. 5 pp. 141-171) from *Computers and Musical Style*, (The Computer Music & Digital Audio Series, vol. 6,1991).
D. Cope, "*Recombinant Music, using the computer to explore musical style*", Computer / Computer-Generated Music (IEEE Computer Society Jul. 1991).
International Search Report issued May 20, 2008 in corresponding PCT/US07/88212.

(Continued)

*Primary Examiner*—Jeffrey Donels
*Assistant Examiner*—Andrew R Millikin
(74) *Attorney, Agent, or Firm*—Pillsbury Winthrop Shaw Pittman LLP

(57) ABSTRACT

The present invention provides a retrograde recombinant composition algorithm that creates new musical compositions based on existing musical compositions that are preferably written in software and is suitable for implementation in electro-mechanical and electronic devices that generate musical works based on existing bodies of music. The retrograde approach to recomposition according to the present invention provides a highly simplified code that executes at a high speed, and accordingly a reduced need for computational resources.

9 Claims, 6 Drawing Sheets

OTHER PUBLICATIONS

D. Cope, "Structure and Coherence" (Ch. 5.21 pp. 172-189) from *The Algorithmic Composer* (A-R Editions Inc. 2000).

D. Cope, "The Analysis Component" (Ch. 2, pp. 53-77) from *Experiments in Musical Intelligence*, vol. 12, (A-R Editions, Inc.) 1996.

D. Cope, "Background and Overview", (Ch. 1, pp. 1-52) from *Experiments in Musical Intelligence*, vol. 12, (A-R Editions, Inc.), 1996.

D. Cope, "The Object System", (Ch. 4, pp. 123-149) from *Experiments in Musical Intelligence*, vol. 12, (A-R Editions, Inc.), 1996.

D. Cope, "Composing Style-Specific Music", (Ch. 4, pp. 93-108), *Virtual Music: Computer Synthesis of Musical Style*, undated, MIT Press, 2001.

D. Cope, "Themes and Variations", (Ch. 9, pp. 153-175), *Virtual Music: Computer Synthesis of Musical Style*, undated, MIT Press, 2001.

D. Cope, "Dear Emmy: A Counterpoint Teacher's Thoughts on the Experiments in Musical Intelligence Program's Two Part Inventions", (Ch. 13, pp. 237-262), *Virtual Music: Computer Synthesis of Musical Style*, undated, MIT Press, 2001.

((3000 48 1000 4 96) (3000 64 1000 3 96) (3000 72 1000 2 96)
(3000 76 1000 1 96) (4000 53 500 4 96) (4000 65 1000 3 96) (4000 69 1000 2 96)
(4000 72 1000 1 96) (4500 52 500 4 96) (5000 50 1000 4 96) (5000 65 1000 3 96)
(5000 71 1000 2 96) (5000 74 1000 1 96) (6000 48 1000 4 96)
(6000 67 1000 3 96) (6000 72 1000 2 96) (6000 76 500 1 96) (6500 77 500 1 96)
(7000 47 1000 4 96) (7000 62 1000 3 96) (7000 67 1000 2 96)
(7000 79 1000 1 96) (8000 45 1000 4 96) (8000 60 1000 3 96)
(8000 69 1000 2 96) (8000 77 2000 1 96) (9000 47 1000 4 96)
(9000 62 1000 3 96) (9000 67 1000 2 96) (10000 48 1000 4 96)
(10000 60 1000 3 96) (10000 67 1000 2 96) (10000 76 1000 1 96)
(11000 48 500 4 96) (11000 60 1000 3 96) (11000 67 500 2 96)
(11000 76 500 1 96) (11500 50 500 4 96) (11500 65 500 2 96)
(11500 77 500 1 96) (12000 52 500 4 96) (12000 60 1000 3 96)
(12000 64 500 2 96) (12000 79 1000 1 96) (12500 50 500 4 96)
(12500 65 500 2 96) (13000 52 500 4 96) (13000 60 1000 3 96)
(13000 67 500 2 96) (13000 79 1000 1 96) (13500 53 500 4 96)
(13500 69 500 2 96) (14000 55 1000 4 96) (14000 67 1000 3 96)
(14000 71 1000 2 96) (14000 74 1000 1 96) (15000 52 1000 4 96)
(15000 67 1000 3 96) (15000 71 1000 2 96) (15000 76 1000 1 96)
(16000 57 2000 4 96) (16000 67 1000 3 96) (16000 69 2000 2 96)
(16000 72 2000 1 96) (17000 66 1000 3 96) (18000 55 1000 4 96)
(18000 59 1000 3 96) (18000 62 1000 2 96) (18000 74 1000 1 96)
(19000 52 1000 4 96) (19000 59 1000 3 96) (19000 64 1000 2 96)
(19000 67 1000 1 96) (20000 45 500 4 96) (20000 60 1000 3 96)
(20000 64 1000 2 96) (20000 72 1000 1 96) (20500 57 500 4 96)
(21000 55 500 4 96) (21000 59 1000 3 96) (21000 67 1000 2 96)
(21000 74 1000 1 96) (21500 53 500 4 96) (22000 52 500 4 96)
(22000 60 1000 3 96) (22000 67 1000 2 96) (22000 76 1000 1 96)
(22500 50 500 4 96) (23000 48 1000 4 96) (23000 60 1000 3 96)
(23000 67 1000 2 96) (23000 76 500 1 96) (23500 77 500 1 96)
(24000 55 2000 4 96) (24000 59 2000 3 96) (24000 67 2000 2 96)
(24000 74 2000 1 96) (26000 56 1000 4 96) (26000 64 1000 3 96)
(26000 71 1000 2 96) (26000 76 1000 1 96) (27000 57 1000 4 96)
(27000 64 1000 3 96) (27000 69 1000 2 96) (27000 72 1000 1 96)
(28000 59 1000 4 96) (28000 62 1000 3 96) (28000 67 1000 2 96)
(28000 74 1000 1 96) (29000 60 1000 4 96) (29000 60 500 3 96)
(29000 67 1000 2 96) (29000 76 500 1 96) (29500 62 500 3 96)
(29500 77 500 1 96) (30000 61 1000 4 96) (30000 64 1000 3 96)
(30000 69 1000 2 96) (30000 79 1000 1 96) (31000 62 1000 4 96)
(31000 64 1000 3 96) (31000 69 2000 2 96) (31000 77 2000 1 96)
(32000 50 1000 4 96) (32000 62 1000 3 96) (33000 57 1000 4 96)
(33000 61 1000 3 96) (33000 69 1000 2 96) (33000 76 1000 1 96)
(34000 60 1000 4 96) (34000 60 1000 3 96) (34000 67 1000 2 96)
(34000 76 500 1 96) (34500 77 500 1 96) (35000 59 500 4 96)
(35000 62 500 3 96) (35000 67 500 2 96) (35000 79 1000 1 96)
(35500 57 500 4 96) (35500 60 500 3 96) (35500 69 500 2 96)
(36000 55 500 4 96) (36000 59 500 3 96) (36000 71 500 2 96)
(36000 79 1000 1 96) (36500 57 500 4 96) (36500 57 500 3 96)
(36500 72 500 2 96) (37000 59 1000 4 96) (37000 55 500 3 96)
(37000 74 500 2 96) (37000 74 1000 1 96) (37500 57 500 3 96)
(37500 72 500 2 96) (38000 55 1000 4 96) (38000 59 1000 3 96)
(38000 71 500 2 96) (38000 76 1000 1 96) (38500 69 500 2 96)
(39000 52 1000 4 96) (39000 64 1000 3 96) (39000 67 1000 2 96)
(39000 72 2000 1 96) (40000 54 1000 4 96) (40000 62 1000 3 96)
(40000 69 1000 2 96) (41000 55 1000 4 96) (41000 62 1000 3 96)
(41000 67 1000 2 96) (41000 71 1000 1 96) (42000 53 1000 4 96)
(42000 59 1000 3 96) (42000 62 1000 2 96) (42000 67 1000 1 96)
(43000 52 1000 4 96) (43000 60 1000 3 96) (43000 67 1000 2 96)
(43000 72 1000 1 96) (44000 50 1000 4 96) (44000 53 1000 3 96)
(44000 69 500 2 96) (44000 74 1000 1 96) (44500 71 500 2 96)
(45000 48 1000 4 96) (45000 55 500 3 96) (45000 72 1000 2 96)
(45000 76 1000 1 96) (45500 57 500 3 96) (46000 50 1000 4 96)
(46000 59 1000 3 96) (46000 71 500 2 96) (46000 77 1000 1 96)
(46500 69 500 2 96) (47000 52 500 4 96) (47000 60 1000 3 96)
(47000 67 1000 2 96) (47000 76 1000 1 96) (47500 53 500 4 96)
(48000 55 1000 4 96) (48000 59 1000 3 96) (48000 67 500 2 96)
(48000 74 1000 1 96) (48500 65 500 2 96) (49000 48 2000 4 96)
(49000 55 2000 3 96) (49000 64 2000 2 96) (49000 72 2000 1 96))

Fig 4A

Fig 4(b)2

RECOMBINANT MUSIC COMPOSITION ALGORITHM AND METHOD OF USING THE SAME

FIELD OF THE INVENTION

The present invention provides a recombinant music composition algorithm and method of using the same, and, more particularly a linear retrograde recombinant music composition algorithm and method of using the same.

BACKGROUND OF THE INVENTION

The practice of algorithmic composition has a long history ranging from mechanical devices (such as wind chimes and automata), through musical dice games (Muisicalisches Wurfelschpiel, attributed to Mozart among others), mathematical, statistical, random and stochastic composition (e.g. the works of Iannis Xenakis) to computational software code and programs such as Cybernetic Composer by Charles Ames (see Ames, Charles. 1987. "Automated Composition in Retrospect: 1956-1986." *Leonardo* 20/2; 169-185; 1989. "The Markov Process as a Compositional Model: A Survey and Tutorial." *Leonardo* 22/2: 175-187.). These antecedents have been extensively surveyed in *Computers and Musical Style* (Cope 1991. *Computers and Musical Style*. Madison, Wis.: A-R Editions, pp 1-18).

While there are various patents that have aspects related to the topic of music composition, the inventor's own prior work is of more significance relative to the present invention. In particular, the inventors own work, commonly known as the "Emmy Algorithm" or "Emmy", is a software package that uses recombinant algorithmic composition and has been taught through the publication of volumes of work, including books and articles, by David Cope, including:

1991a. *Computers and Musical Style*. Madison, Wis.: A-R Editions;

1991b. "Recombinant Music." *Computer Music Journal* 24/7: 22-28;

1992. "Computer Modeling of Musical Intelligence in EMI." *Computer Music Journal* 16/2: 69-83;

1996. *Experiments in Musical Intelligence*. Madison, Wis.: A-R Editions;

2000. *The Algorithmic Composer*. Madison, Wis.: A-R Editions;

2001. *Virtual Music*. Cambridge, Mass.: MIT Press;

2003. "Computer Analysis of Musical Allusions." *Computer Music Journal* 27/1: 11-28;

2006. *Computer Models of Musical Creativity*. Cambridge, Mass.: MIT Press;

The process used within the Emmy software has been referred to throughout the inventor's work generically as Experiments in Musical Intelligence. The fundamental algorithmic sequence of the Emmy software can be represented by the logic flow illustrated in FIG. 1, which shows, from a music database 100, operations that include pattern matching step 110, segmentation step 120, hierarchical analysis step 130, non-linear recombination step 140, which result in the output 150.

The music database 100 is essentially the embodiment of a musical composition, or musical performance, in a tangible or legible form, format, language, or code that can be interpreted and executed by devices such as a computer, a musical instrument with a digital interface, a sound synthesizer, digital-to-analog audio reproduction system, or any combination of electrical, electromechanical, or mechanical musical devices. For instance, a musical score is, in and of itself a musical database of a composition, and a phonograph recording is an analog musical database of a performance. In an Emmy database, the groupings of notes in a musical phrase, or more precisely the "events" in a musical phrase, are assigned numerical values according to their pitch, duration, location in the work, voice, amplitude and/or other sonic and temporal qualities which characterize the notes. A single event is the grouping of notes which constitute a single beat in a musical work. Collections of numerical values of notes are compiled to represent successively longer measures, phrases, sections, and so forth. These compilations are called event lists, and are susceptible to processing by digital list-processing computer applications (such as the computer language known as LISP, short for List Processor).

Event lists describe the various attributes of each note with a single list of parameters of at least five separate but related elements, as follows:

The first element of the event list is the on-time, or the time elapsed between the beginning of the work and the initiation of the note. On-times are assigned numerical values in Emmy based on a standard metric of 1,000 ticks per second, which is usually equated with the length of a quarter note. On-times are relative, not absolute. As with printed music, the actual on-time of a pitch is determined by a combination of on-time (location in the score) and tempo (pace of playing). For example, an on-time of 1,000 could begin 1 second after 0 with a tempo of m.m. 60, 2 seconds after 0 with a tempo of m.m. 30, half a second after 0 with a tempo of m.m. 120, and so forth. Events describe only sound events (note ons and note offs), not silences or rests, relieving databases of vast amounts of unnecessary data. Silences, or rests, are represented by default as the result of a lack of events.

The second entry of the event list is pitch. In Emmy, pitch is assigned a numerical value using the established Musical Instrument Digital Interface ("MIDI") standard, with middle C (520 cycles per second) equal to MIDI note number 60. Additions and subtractions of 12 produce C in various octaves, and additions and subtractions of 1 create half steps. Thus, the numerical sequence 60-62-64-45-67-69-71-72 represents the C major scale with intervening numbers (61, 63, 66, 68, 70) producing chromaticism to that key.

The third entry of the event list is duration. Duration, as with on-time, is figured to a quarter note's equaling 1,000 ticks; relative durations are figured from that standard. The duration of an event implies the MIDI note off-time, which can be independently figured as the addition of the on-time plus the duration. Thus, an event with an on-time of 6,000 and a duration of 1,000 has an off-time of 7,000. Duration, as with on-time, is relative, being a factor of its value within the current tempo.

The fourth entry of the event list is channel number. The channel numbers indicate the original voice separation of the music entered into that database (e.g.: soprano, alto, tenor, bass; or, trumpet, saxophone, guitar, drums, etc.). Channel numbers are used to indicate the voice from which events were harvested or will be assigned for performance in the score of the new composition or, perhaps, for performance by a digitally enabled instrument (e.g. an instrument compatible with the industry-standard Musical Instrument Digital Interface). Channel numbers are theoretically unlimited, but in practice, 64 channels are sufficient for most music.

The fifth entry of the event list represents dynamics. Dynamics are based on 0 equaling silence and 127 equaling fortissimo, with the numbers between these values being relative to these extremes.

Numbering systems, while logical are arbitrary and therefore many alternative numbering systems are possible. For instance, a base metric of 10,000 ticks per second could be used for event duration, and a scale of 0 for silence to 254 fortissimo. Additional entries, a sixth, seventh and so on, into databases may be made as needed for other musical qualities and quantities pertaining to musical notes or events, such as tremolo, aftertouch, and so forth. Events are open-ended, that is, one may add any desired parameter to the end of event lists with no ill effects on the first five elements. Events are compiled into collections of larger phrase, section, or work, lists. Events are typically ordered sequentially (i.e. beat one, then beat two, and so forth) to make visual event reading simple and logical. Databases can be created by manually translating scores into event lists, or by software that automatically scans printed scores (sheet music) and translates them into events lists, by performing the work through a digitally-enabled instrument (sometimes referred to as "step entry") or by software that automatically analyzes performed music and translates it into events lists, or any combination of these techniques.

As with any large collection of data, in order for a database incorporating many musical events to be manageable it is beneficial to clarify, or make the data homogeneous in ways that preserve its essential characteristics and variety while facilitating analysis and processing. For instance, all works may be transposed into the same key signature, tempo, and so forth, without radically altering their distinctive melodic and harmonic characteristics and intervalic relationships between their notes. The precise format of the list will be determined by the type of application which will be used to process the data.

The Emmy algorithm assumes that every work of music contains an inherent set of instructions, or rules, for creating different but highly-related replications of itself—an assumption which is generally agreed to by musicologists. These instructions, when analyzed and interpreted correctly, lead to important discoveries about this music's structure as well as providing a key to producing new instances of music that are stylistically-faithful to it.

The pattern matching step 110 is the process of comparing events lists representing musical works or phrases in the musical database to discover what elements they have in common. Highly recurrent patterns in a single work typically represent thematic material, such as a particular melodic line and associated chord progression. However, patterns which recur in more than one work can be construed as the essence of the style of a particular composer or genre. Style is inherent in recurrent patterns of the relationships between the musical events, in more than one work. The primary constituents of these patterns are the quantities and qualities captured and represented in the musical database event lists—essentially pitch, duration, and temporal location in the work—although other factors such as dynamics and timbre may come into play. Patterns may be discerned in vertical, simultaneous relationships, such as harmony, horizontal, time-based relationships, such as melody, as well as amplitude-based relationships (dynamics) and timbral relationships. Patterns might be identical, almost identical, identical but reversed, identical but inverted, similar but not identical, and so forth. The Emmy algorithm searches the databases for such patterns using controllers that either restrict the search to detecting patterns that are highly similar, or widen the search to detect patterns that are loosely similar. The essence of this process is to reiteratively select the event list of differing portions of the music and look for other instances of the same, or similar, events lists elsewhere in the database, and to compile catalogues of matching events lists, ranking them by frequency of occurrence, type, and degree of similarity. The objective of this search, whether the pattern-matching net is cast tightly or widely, is to detect patterns that characterize the commonalities, or "style," of the bodies of music in the musical databases.

Matches that are long in duration and loosely similar, for instance, characterize the form which the works in the database share. In a rudimentary example, the basic twelve-bar blues form—(AAB)—would be discovered and registered as a match in a database containing several blues. Formal patterns, generally of long duration, will often have widely varied content within the components of the pattern. The pattern matching controllers are therefore set to discover and compare larger musical structures while de-emphasizing or ignoring the details within the form. (By analogy, a poetry-form pattern matcher would discover the sonnet form by finding commonalities in the number of lines, meter, and rhyming scheme, while ignoring the words. Even if some sonnets in the database were in English and others were in Italian, the form uniting them could be discovered.)

Matched patterns of shorter duration, such as beats, measures and short phrases, are also sought and catalogued. These commonalities are denominated "signatures" in Emmy. In the recomposition process, signatures are preserved and serve to ensure that stylistic qualities are inherent in the musical output.

In the Emmy algorithm, superficial, thematic material specific to a particular work should not be mistaken for deeper commonalities shared by many works by the same composer, or in the same genre. For instance the "di-di-di-dah" motif of Beethoven's Fifth Symphony is a thematic component specific to that work and is not a signature that is found in very many or all of Beethoven's work. The pattern-matching controllers in Emmy can be adjusted to reject thematic material as superficial and irrelevant to the discovery of signatures. This is achieved by rejecting matches that occur with relatively high frequency in a single work but occur with relatively low frequency, or are entirely absent, in other works.

The essential outcomes of the pattern-matching step 110 are two-fold: long forms present in the source material, particularly forms of musical-phrase length and larger, are identified for use as templates for future recomposition; and stylistic signatures are captured so that instances of them can be protected (not broken apart) and re-implanted in the composition process.

In order to recombine music it must, self-evidently, be broken into constituent elements first. This process is referred to in the Emmy software as segmentation step 120. Segments, typically, consist of beats—the groupings of notes which correspond with one beat in the music. However, segmentation of existing musical works into smaller components, and haphazard recombination of them into new orders, would produce musical gibberish, as would fragmenting written language sentences into words and haphazardly recombining the words without regard to grammar (syntax) or meaning (semantics). Although segmentation in the Emmy software is fundamentally straightforward—the identification of each beat and its conversion into an event list—each segment will become progressively more complex as contextual analysis is applied to it. Each beat-segment will accumulate and carry with it at least the following information: the destination note for each note in the beat (i.e. the note in the corresponding voice which follows it in the original work); the grouping of beats, or phrase, to which it belongs; the location of the phrase within the work; its SPEAC value (see below); and whether it is part of a signature that will be protected and not broken apart in the re-composition process.

While the pattern matching step 110 analyzes form from an essentially syntactical point of reference, hierarchical, or SPEAC, analysis step 130 investigates the semantic structure of music and provides tools for ensuring that when music is recombined, syntactically correct music is also semantically intelligible.

The differentiation of two or more apparently identical but functionally different musical events by analyzing the context in which they occur is extremely important in the Emmy algorithm. The musical function of a note, or chord, in a piece of music depends on its context, particularly the musical interval between the notes or chords that precede or follow it. This may not be intuitively obvious to a non-musician, but can be illustrated by an analogy. In spoken language, homonyms (same-spelled and spoken words) can have quite different functions and meanings, for instance in the sentence "I saw the saw saw." The word "saw" appears three times in this sentence, with each appearance having a different meaning and making a different syntactic contribution (subject verb, object noun, object verb, etc.) and semantic meaning (because we know that saws cannot see, we infer that the final appearance cannot be a part of the verb "to see" and must therefore refer to the act of sawing). Only the context distinguishes each word's true function and meaning. The same is may be said of music.

Tonal-music leading tones provide an example of how hierarchical analysis differentiates between apparently identical functional motions in music. The leading-tone note in the key of C Major (B), for example, strongly leans toward the tonic note when found in dominant, dominant-seventh, and leading-tone harmonies. However, the same leading-tone note appearing as the fifth of the mediant triad does not necessarily lean toward the tonic note (C), but in fact often moves more naturally elsewhere—the submediant note (A), for example. Thus, the same leading-tone note can be analyzed differently depending on its context. This insight provides a very important foundation for Emmy approaches to structural analysis.

For these reasons the Emmy software adopts a hierarchical approach to musical analysis, which is based on a combination of musical tension and musical context that are analyzed, evaluated and assigned a numerical weighting. This weighting combination closely parallels the manner in which one hears music, almost regardless of its style or period of composition, and hence represents the core of the analysis component of Emmy composing programs The hierarchical approach uses a process that goes by the acronym SPEAC, the acronym being based on the identifiers—Statement (S), Preparation (P), Extension (E), Antecedent (A), and Consequent (C)—which will be assigned to events and groupings of events. SPEAC analysis also parses these selected groupings of events to extract information about their role in increasingly large musical structures, from beats to measures, to phrases, sections, and even to whole works. While traditional tonal functions provide analysis of surface detail, the SPEAC approach provides deeper insights into musical structure. In other words, SPEAC derives musical meanings from context as well as from content. SPEAC identifiers function in the following ways:

S=Statement; is stable—a declaration of material or ideas. Statements typically precede or follow any SPEAC function.

P=Preparation; is unstable—an introductory gesture. Preparations precede any SPEAC function though more typically occur prior to statements and antecedents.

E=Extension; is stable—a continuation of material or ideas. Extensions usually follow statements but can follow any SPEAC function.

A=Antecedent; is very unstable—requires a consequent function. Antecedents typically precede consequents.

C=Consequent; is very stable—results in consequent gestures. Consequents must be preceded directly or indirectly (with intervening extensions) by antecedents.

SPEAC identifier assignments follow an A-P-E-S-C stability order with the most unstable identifier to the left, and the most stable identifier to the right. Therefore, A and P require resolution while E, S, and C do not. Thus, progressions of identifiers such as PSEAC and SEA are musically logical, progressions such as AEPS and SAPC, while not impossible, are less logical. David Cope: "*Algorithmic Composer" p.* 194 provides an example of SPEAC analysis as applied to a Bach Chorale.

While these approaches to defining roots, tensions, and groupings seem logical in principle, methods of converting these roots and tensions into numerical values for contextual comparison and analysis is not obvious. To achieve conversion, the Emmy software uses an empirically derived formula:

$$f(x)=y+(\cos((-1*z)+x/z))/2$$

where x is the pitch-class interval, y represents the y coordinate, and z is a constant. This formula roughly accounts for the primary intervals (seconds, thirds, and fourths).

Secondary intervals (sixths and sevenths as inversions of thirds and seconds respectively) then approximately mirror the primary intervals, with the fifth is treated uniquely as it has very little tension. Intervals greater than an octave have slightly less (0.02) tension than their related less-than-octave-separated equivalents, because of their octave separation. When this formula is applied to the intervals within several chords in a particular work, the relative totals produced by the formula will indicate what the SPEAC role of each chord is. For instance, a chord which produced a total of 0.5 would be the antecedent, "A," in the context of a preceding chord with a value of 0.2 and a succeeding chord with a value of 0.3; however, the identical chord with its value of 0.5 would be a consequent, "C," in the context of a preceding 0.8 and a succeeding 0.4. While the intervals in the event determine its fixed value, or weighting, the context in which the event occurs determine its relative position in the SPEAC hierarchy—both in the original works in the database and in recombined works.

After SPEAC hierarchical analysis step 130 has been performed, every event and grouping of events, will carry with it its SPEAC identifiers and weightings, which will be essential in order to accomplish musically-logical, structurally sound, and context-sensitive re-location of events and event-groupings in the recombination process.

The Emmy software employs a recombination step 140, which is made possible by prior pattern-matching step 110, segmentation step 120, and prior SPEAC hierarchical analysis step 130 of the database 100. Non-linear recombination step 140 is the compositional process that synthesizes the results of the pattern-matching step 110 (form, and signature detection) and the hierarchical SPEAC analysis step 130 (context-sensitive, structural analysis) components of the Emmy algorithm.

Tonal music follows well-known principles governing pitch (notably major and minor scale derivation and complementary chromaticism), melody (primarily stepwise motion with leaps often followed by stepwise contrary motion), harmony (having prescribed functions and syntax), voice-leading (mostly stepwise motion with voice independence), hierarchical form (phrases, sections, and movements governed by logical repetitions, variations, and contrasts), and so on. One way to algorithmically create tonal music is by programming rules for each of these principles. Unfortunately, as has been shown (see David Cope: 2001a), this rules-based approach produces technically correct, but musically stale imitations. Additionally, this approach requires programming a new set of rules for every composer or genre of tonal music under consideration.

Recombinancy, on the other hand, is a method for producing new and logical, i.e. musically logical, collections of musical events (i.e. new compositions) by recombining existing data into new logical orders on the basis of the rules which have been acquired through analysis of specific works or bodies of work (as distinct from the imposition of generic rules).

Recombinancy appears ubiquitously as natural processes as well as a human creative process. As a simple human-creative example, all the great works of literature in the English language result from combination of the twenty-six letters of the alphabet into words, and recombination of those words. Similarly, most of the great works of Western art music consist of combinations of the twelve pitches of the equal-tempered scale, their octave equivalents, and the recombinations of groupings—melodies, harmonies, and so on—that result from these combinations.

As stated previously, the Emmy algorithm assumes that every work, or stylistically consistent body of music, contains an implicit set of instructions, or rules, for creating different but highly-related replications of itself. Consequently, recombinancy, based on rules acquisition (as distinct from rules imposition) provides logical and successful approaches to composing new, highly-related replications of the original work(s).

One of the most important impacts that SPEAC analysis has on algorithmic composition involves the order in which groupings of events are selected and embedded in new compositions in a way which is faithful to the sets of instructions, both formal (i.e. discovered by pattern-matching analysis), and context sensitive (i.e. identified and evaluated by SPEAC analysis), that have been acquired from the database. SPEAC allows for a non-linear approach to recombinant composition. Significant (relatively high SPEAC values) antecedent (A) and statement (S) groupings of a new work are selected first, and the remaining groupings follow in SPEAC priority order. In short, key components (groupings of musical events) of a new work may appear in many places within an overall formal structure initially, simultaneously, rather than appearing first at the beginning of a new work in progress and continuing to be added until the end is reached, in a linear manner. This non-linear process closely resembles how human composers create large-scale works, by envisioning an overall form, or structure, for the work, and then progressively filling in the details.

The non-linear recombination step 140 of the Emmy software algorithm is founded on the principles of Augmented Transition Networks (ATNs) widely employed in computational linguistics and adapted in the Emmy software for processing music instead of language. The implementation of ATNs in the Emmy software is highly complex, in large part because music, unlike spoken language, has few universal rules of syntax (grammatical rules). Short sequences of musical events do not have commonly-agreed meanings (comparable to the dictionary definition of a part-of-speech made up of letters of the alphabet). Nor do longer musical phrases have established meanings in the way that a sentence usually does. By way of illustration, many English speakers could readily explain how the sentence "The dog eats a bone." is grammatically-correct and also make sense, whereas the sentence "The dog sang a bone" although equally grammatically correct is illogical. But most listeners and even musicians would find it difficult if not impossible to explain why one piece of music might make less musical sense than another structurally similar one. However, music does share with language such qualities as form (poetic literary forms have much in common with musical forms) and style (the characteristics of certain writers can be recognized and to some extent defined). Music also has rules of syntax, but they are nor universal. Rather, they are specific to genres, composers, and in some case even to individual works. Music is not a language, but many languages, and many families of languages with countless idioms and dialects. It is precisely because there is no universal set of rules that can be discovered in all music that the Emmy software focuses on rules acquisition from the musical database in use. This enables the Emmy software to powerfully analyze almost any musical database and recompose in any style, rather than be restricted to a single style by a single set of rules.

The output 150 of the Emmy software is a musical database with an entire new composition, stylistically faithful to compositions in the original database and resembling them, derived from them but not replicating them, resulting from the integration and synthesis of the process steps described above. It can be manifested as a score to be played by musicians, a digital file which can be input into an electromechanical device, such as a MIDI-enabled instrument or sound synthesizer, or readily converted into any other form of musical expression or performance.

While the Emmy software has many advantages in many environments, it is complex and requires considerable memory just to store the executable code. Due to its high-level, AI functions, linguistics-based ATNs and other expert systems, it is also computationally intensive, requiring a very large number of computing cycles to execute the encoded instructions of the algorithm. It is therefore highly unsuited to the rapid, recombinant, re-composition of short musical works, such as would be deployed telephone ringtones, musical toys, videogames, music boxes, and other similar applications requiring rapid and repetitive iterations of new music based on existing bodies of music.

SUMMARY OF THE INVENTION

In one aspect, the present invention provides a recombinant music composition algorithm and method of using the same.

In another aspect, the present invention provides a linear retrograde recombinant music composition algorithm and method of using the same.

In one embodiment, there is described a method for composing a new musical work based upon a plurality of existing musical work segments. Upon providing a plurality of existing musical work segments, a final cadence segment of the new musical work is selected, and thereafter in a retrograde manner, a plurality of musical work segments are also selected.

In a particular embodiment, the new musical work is created from end to beginning.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein.

DETAILED DESCRIPTION OF THE PREFERRED EMBODIMENTS

The linear retrograde recombinant music composition algorithm software according to the present invention (termed LRRMCA for shorthand herein), is an algorithm which is suited to the rapid re-composition of musical works, especially relatively short musical works, and is preferably written in software that can be deployed in digital, electronic and electro-mechanical devices such as telephone ringtones, musical toys, music boxes, videogames, and other similar applications, already existing or as yet undeveloped, requiring rapid and repetitive iterations of new music based on existing bodies of music. LRRMCA uses simple retrograde recombinant algorithms to eliminate computational intensity in order to quickly produce an output that is stylistically faithful to and resembles existing bodies of music, derived from but not replicating them. While the LRRMCA uses comparatively trivial computational resources to produce musical output, the output is less reliably faithful to the works in the musical database than the non-linear algorithms previously described. However, LRRMCA's almost instantaneous speed of production compensates for any loss of verisimilitude, as does the ease and speed of disposability and replacement of undesirable output. In most applications, such as telephone ringtones, or the generation of advertising "jingles," unsatisfactory output can be discarded without significant cost.

Figure 1:
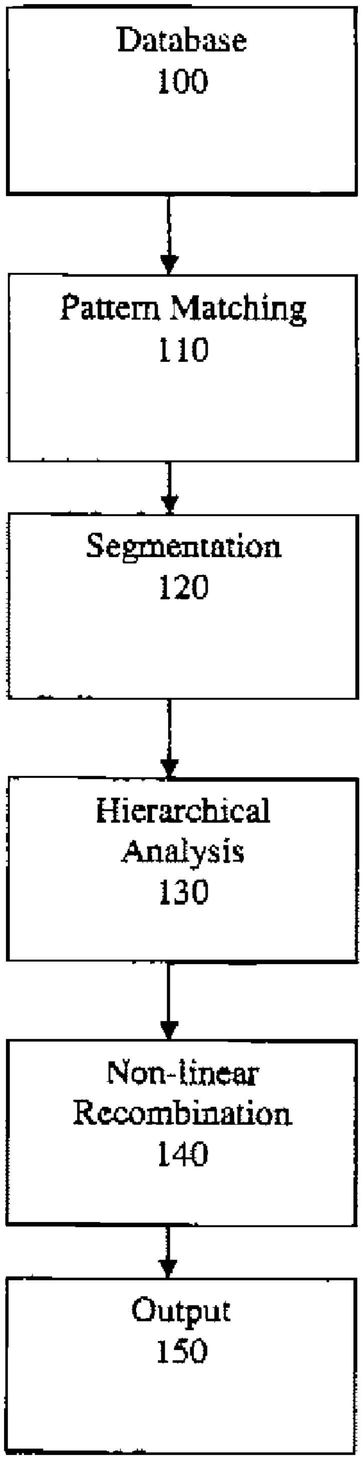
FIG. 1 illustrates a flowchart of a prior art musical composition algorithm system.
Figure 2:
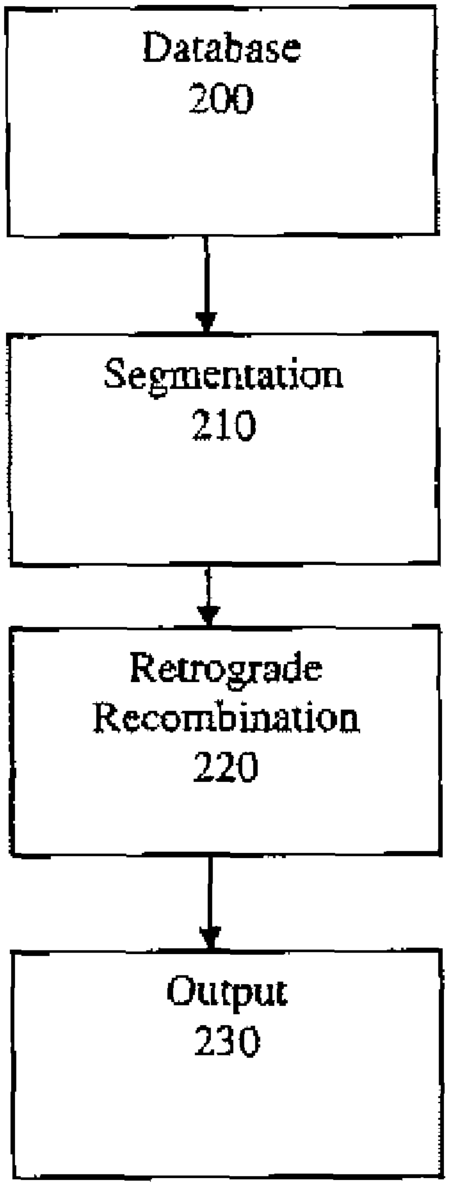
FIG. 2 illustrates a flowchart of a musical composition algorithm system according to the present invention.

The fundamental algorithmic sequence of the LRRMCA can be represented by the logic flow illustrated in FIG. 2, which shows, from a music database 200, segmentation step 210, retrograde recombination step 220, which result in the output 230. These steps performed by the LRRMCA are now described in more detail.

The music database 200 in LRRMCA has essentially the same aspects as described in the Emmy algorithm software above. It contains lists of the musical events that represent the existing work, or works, that form the input which will be segmented, processed and recombined to form new music output. Musical events are assigned values for the five basic parameters—on-time, pitch, duration, channel, and dynamics. Of the five basic parameters at least the first three, on-time, pitch and duration, are essential; the fourth, channel, is necessary for polyphony; and the fifth only if dynamics are a desired quality of the output.

The segmentation step 210 in LRRMCA is fundamentally the same as in the Emmy algorithm, with a beats length segment forming the basic increment of segmentation of the source works.

During the creation of the music, various segments are connected together in order to achieve the new musical score. As will be described in more detail hereinafter, when connecting together two pieces of music, or segment, the destination-note at the end of one piece or segments and the note at the beginning of the next piece or segment will be same, as described further herein (though this can also be viewed as the note at the beginning of one piece or segment and the end of what will become the previous piece or segment being the same). As such, in the resulting work either the note at the beginning of one segment or the end of the other segment will be dropped, though information about this note is included in the stored file in some manner. This note can also be viewed as an extra or a superfluous note that will not be used in the resulting work. This note is termed herein destination note, and has associated with it destination note information, and is part of what is referred to herein as part of the segment, though it is a part of the segment that will not be included in the resulting work. A segment will only incorporate information with respect to the list of events pertaining to the notes in the segment itself plus destination-note information. Thus, a segment will often constitute as little as a single beat of the existing music, along with its destination-note information, although longer segments of two or more beats may optionally be selected. In LRRMCA destination-note information is preferably the information pertaining to the notes at the end of the segment that preceded it in the existing work. Destination-note information makes it possible to identify at least one and usually many more segments from the existing work that have the same corresponding ending notes. Possessing these same corresponding end notes makes these segments eligible to be selected to precede the current segment during the creation of the new score.

After segmentation step 210 is performed on the existing work or works in the database, retrograde recombination step 220 can occur. In contrast to the Emmy algorithm previously described, retrograde recombination step 220 is performed without recourse to AI pattern matching, hierarchical SPEAC analysis, or ATNs. This retrograde process is founded in the observation that, in the great majority of tonal-music forms and traditions, the end of a musical work is far more critical to the listener's perception that the work makes musical sense than is its beginning. The constraints governing the beginnings of musical phrases or works are significantly less bound by musical logic and convention than the ends of musical phrases or works. This is because, whereas the listener has few, if any, previously developed expectation of what will happen when a piece of music begins, towards its end many expectations have been developed as the listener has accumulated awareness of certain structural characteristics such as key-signature, time-signature, melodic and harmonic progression, and so forth, which collectively invoke musically-proscribed cadential resolutions. Hence, LRRMCA begins a new musical work by selecting, either randomly or using an algorithm or process as described below, a segment that represents a cadence in its database of existing works. A cadence in music often occurs at the end of a phrase and almost invariably at the end of a work. Through application of such simple criteria, cadences are easily identified and can thus be selected to initiate the composition process. LRRMCA, in the retrograde recomposition step 220, then composes backwards from the selected cadence segment, selecting and accumulating segments that have ending notes that correspond with the destination-note information included in the previously selected segment. This process therefore unfolds in a linear, retrograde fashion. The resulting composition will be represented, as output, in the reverse direction, thus ending with the cadence segment.

Figure 3:
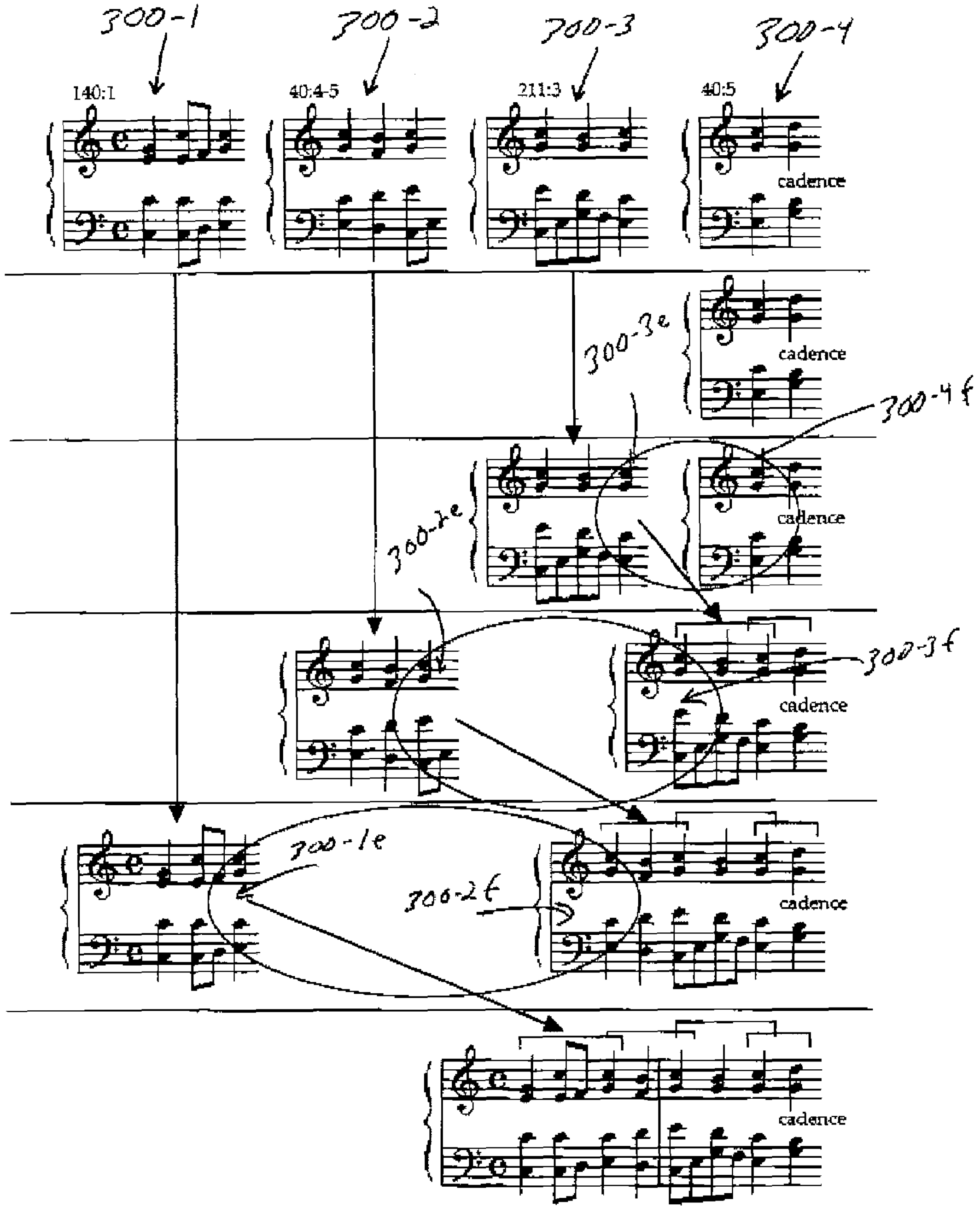
FIG. 3 illustrates an example of retrograde recombination according to the present invention.

An example that illustrates the linear retrograde recomposition step 220 is diagrammed in FIG. 3, which shows four musical segments of varying lengths, 300-1, 300-2, 300-3, and 300-4, from an existing piece of music 300. Each of these segments can be construed as a combination of an initial beat of destination-note information (corresponding to the final notes of the previously occurring segment) that precedes its remaining beat or beats. As illustrated, the end beats 300-1*e*,

300-2*e*, and 300-3*e* in each of these segments 300-1, 300-2, and 300-3 exactly coincide with the destination note initial beats 300-2*f*, 300-3*f* and 300-4*f* of the segments 300-2, 300-3 and 300-4. In the retrograde recomposition process, LRRMCA first selects a cadence segment, in this example the end beat of segment 300-4, in order to begin the process. It then seeks any segment that ends with an end beat corresponding the destination notes represented by the first beat of the segment 300-4. In this case it selects segment 300-3, which fulfills this condition. Segment 300-3 is then added to segment 300-4 4, after first removing the superfluous destination notes as discussed above. (To avoid undesirable repetition, which can occur when the same notes are sustained for several beats in a segment, the end beat of 300-3 is eliminated from the database, not used for some period of time, or otherwise-re-processed with an algorithm implemented in software code of the type described above.) This process is repeated until the final segment, 300-1, is accumulated. This example illustrates both the simplicity of, as well as the powerfulness of, the linear retrograde combination according to the present invention.

In a database consisting of more numerous segments of an initial piece of music 300, there will typically be more than one instance of segments that have an end beat that exactly coincide with destination notes of other segments. In FIG. 3, for instance, the end beats of both 300-1 and 300-3, i.e. 300-1*e* and 300-3*e*, coincide exactly with the first beat of 300-4*f*. Therefore, segment 300-1 could have been selected instead of 300-3 to precede segment 300 4. Random selection of which of the eligible beats will precede segment 300-4, i.e. 300-1 or 300-3 in FIG. 3, enables LRRMCA to produce varied musical output. Refinements to the retrograde recomposition step 220 illustrated in FIG. 3 that may be input by a user or embodied in software or hardware, include but are not limited to: code that determines the length of the composition (for instance, sixteen beats); code that ends the composition when an initial segment from an existing work is encountered, code that prevents the output from exactly replicating all or a significant portion of the existing music; code that prevents the output from exactly replicating prior output; code that repeats the output (“looping”); and code that can connect one piece of musical output with another piece of musical output thus creating longer structures (for instance, conventional musical structures such as ABA, ABBA, ABABA, etc.), and other refinements such as would be evident to one ordinarily skilled in the art of music composition. It is preferable to have the selection of segments, particularly the selection of segments after the initial (end) cadence segment, automatically selected based upon operation of the software or hardware, without requiring further intervention by the user Note that the LRRMCA algorithm does not utilize A1 pattern matching, SPEAC analysis, or any other hierarchical analysis processes requiring or required by non-linear recombination for recomposition purposes; nor are ATNs employed. Note also that no pattern-matching operations have been applied to the database to extract forms to act as skeletons for the new composition(s), nor have signature been extracted for re-embedding, intact, in the new composition (s). Because A1 pattern-matching, signature collection and structural (SPEAC) analysis do not take place in LRRMCA, the events lists which represent the segments in LRRMCA are very lean and contain only the information minimally necessary for retrograde recombination works lacking structural complexity. Since computational resources needed to analyze data grow in roughly exponential proportion to number of data elements simultaneously involved in the computation, this reduction in scale and complexity of the data results in order-of-magnitude increases in speed of processing and, or, reduction in needed computational resources.

The output 230 of LRRMCA process is a new musical composition based on existing music in the database, stylistically faithful to it and resembling it, derived from it but not replicating it. Generally short in duration and lacking structural complexity, LRRMCA output, 230, is a piece of music, or musical motive—typically but not necessarily from 16 to 48 beats in length. Such output, along with the computational efficiency and compactness of the algorithm, makes LRRMCA written in software particularly suitable for implementation in electro-mechanical and electronic devices that generate musical works and, or, that produce rapid, and in some cases repetitive, iterations of new music, based on existing bodies of music. Such devices include, but are not limited to, telephone ringtones, musical toys, music boxes, computer-video games, and music-composition workstations. Operationally, such devices may constitute LRRMCA code executable on the operating system of a computer, or LRRMCA may be embedded in tangible form as hardware in integrated electronic circuitry and, or, “chips,” or any other technological process or device, or combination thereof, capable of inputting musical data, executing LRRMCA, and outputting musical data.

Figure 4B:
FIGS. 4(*a*) and 4(*b*)1-2 illustrate a sample music database, and the music corresponding thereto.

FIGS. 4(*a*) and 4(*b*)1-2 illustrate a sample music database that contains the event list, and the music corresponding thereto.

Although the present invention has been particularly described with reference to embodiments thereof, it should be readily apparent to those of ordinary skill in the art that various changes, modifications and substitutes are intended within the form and details thereof, without departing from the spirit and scope of the invention. For example, while the present invention is preferably implemented using a retrograde linear algorithm, the present invention can also be implemented to create a new musical work from beginning to end, as well as create a new musical work from both the beginning and the end, and then connects the beginning segments and the end segments together using a connecting musical work segment. Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

What is claimed:

1. A method for automatically composing a new musical work based upon a plurality of existing musical work segments using a programmed linear retrograde recombinant musical composition algorithm that is executed by one of a processor and a circuit and contains memory that includes a musical database therein comprising the steps of:

providing the plurality of existing musical work segments in the musical database, each of the existing musical work segments including pitch, duration, and on-time, each of the plurality of existing musical work segments further including a destination note information that is used by the programmed linear retrograde recombinant musical composition algorithm that is executed by one of the processor and the circuit to determine a correspondence with others of the plurality of existing musical work segments;

automatically selecting a final cadence segment of the new musical work from the plurality of existing musical work segments from the musical database using the programmed linear retrograde recombinant musical composition algorithm that is executed by one of the processor and the circuit; and automatically and sequentially selecting using the programmed linear retrograde recombinant musical composition algorithm that is executed by one of the processor and the circuit, in a retrograde manner, a plurality of musical work segments from the plurality of existing musical work segments such that, for each sequentially selected segment, a last beat of the selected segment corresponds to the destination note information of a previously selected segment, wherein the final cadence segment is an initial previously selected segment.

2. The method according to claim 1 wherein the step of sequentially selecting selects, using the programmed linear retrograde recombinant musical composition algorithm that is executed by one of the processor and the circuit, the plurality of musical work segments such that the new musical work is composed from end to beginning.

3. The method according to claim 2 wherein the step of sequentially selecting selects at least 8 musical work segments.

4. The method according to claim 2 further including the steps of:

selecting an initial segment of the new musical work from the plurality of existing musical work segments using the programmed linear retrograde recombinant musical composition algorithm that is executed by one of the processor and the circuit;

sequentially selecting, using the programmed linear retrograde recombinant musical composition algorithm that is executed by one of the processor and the circuit, another plurality of musical work segments from the plurality of existing musical work segments such that, for each sequentially selected segment, a last beat of the selected segment corresponds to the destination note information of a previously selected segment, wherein the initial segment is an initially selected segment; and automatically connecting the plurality of musical work segments and the another plurality of musical work segments with a further musical work segment to create the new musical work using the programmed linear retrograde recombinant musical composition algorithm that is executed by one of the processor and the circuit.

5. The method according to claim 1 wherein the step of providing provides, for at least some of the existing musical work segments, a voice (channel) and dynamics of at least some of the notes.

6. The method according to claim 1 wherein the step of providing provides each of the plurality of existing musical work segments in the musical database in a form that includes events lists for the notes of the beat or beats in the existing musical work segment as well as the events list for the notes of the beat that preceded the existing musical work segment in music from which that existing musical work segment came.

7. The method according to claim 1 wherein the step of sequentially selecting selects at least 8 musical work segments.

8. The method according to claim 1, wherein the programmed linear retrograde recombinant musical composition algorithm is written in software that is executed by the processor.

9. The method according to claim 1, wherein the programmed linear retrograde recombinant musical composition algorithm is programmed into the circuit.

* * * * *